United States Patent [19]
Putz

[11] 3,715,602
[45] Feb. 6, 1973

[54] CIRCUIT ARRANGEMENT FOR BRAKING A VEHICLE

[75] Inventor: Ulrich Putz, Berlin 41, Germany

[73] Assignee: Licentia Patent - Verwaltungs-G.m.b.H., Frankfurt, Germany

[22] Filed: March 20, 1972

[21] Appl. No.: 236,323

[30] Foreign Application Priority Data

March 20, 1971 Germany...................P 21 14 121.9

[52] U.S. Cl. ................................................. 307/9
[51] Int. Cl. ................................................. H02g 3/00
[58] Field of Search.......105/61; 307/10 R, 106, 149, 307/125, 126, 127, 128, 129, 9; 318/362, 372, 375; 310/92

[56] References Cited

UNITED STATES PATENTS 3,371,253  2/1968  Hubbard..........................307/10 R Primary Examiner—Herman J. Hohauser
Attorney—George H. Spencer et al.

[57] ABSTRACT

A circuit arrangement for the combined net and resistance braking of an electrically driven vehicle is fed via a pair of lines from a direct current power system. A capacitor is connected across the pair of lines, as is a resistive braking circuit composed of a series arrangement of a braking resistor and a controllable switch. A voltage regulating circuit having its input connected in parallel with the capacitor and its output coupled to the control input of the controllable switch is arranged to develop a control signal upon the occurrence of a voltage across the capacitor which exceeds slightly the rated voltage of the pair of lines.

13 Claims, 3 Drawing Figures

CIRCUIT ARRANGEMENT FOR BRAKING A VEHICLE

BACKGROUND OF THE INVENTION

This invention relates to a circuit arrangement for the combined net and resistance braking of electrically driven vehicles.

The present invention relates, more particularly, to a circuit arrangement for the combined net and resistance braking of electrically driven vehicles which are fed from a direct current power system via a pair of lines. In a practical application, the pair of lines may consist of a trolley wire and a ground connection. The vehicle may be driven by either a direct current motor which is connected across the lines via a switch or an alternating current motor which is connected across the lines via a converter.

In order to provide a smooth ride, braking of an electrically driven vehicle usually requires substantially higher power than starting because it is the practice to brake the drive motors from full speed with torques which lie in the order of magnitude of the starting moment and, in some instances, torques which are even higher. Fully electrical net braking is thus possible only if, at the time of braking, a number of other loads are capable of using the corresponding power supplied to the mains from the braked vehicle or if the substations are able to store such power and to feed the stored power back into the mains. The feedback capability of direct current substations, however, has not heretofore been investigated since no requirement existed for feedback capability before the introduction of controlled semiconductor rectifiers. Moreover, the voltage drops across the mains would be changed in polarity so that an excess voltage would occur at the vehicle itself, which would endanger the entire electrical system. This can be overcome by using a braking resistance in which the full kinetic energy of the vehicle is converted to heat as soon as the net, i.e. the system power network, can no longer absorb all of the energy. In order to be able to at least somewhat utilize the advantage of the net braking, the amount of power fed back is adapted to the needs of other available loads, only the excess energy being converted into heat in the braking resistance. Known electrically driven vehicles with mixed net and resistance brakes, however, exhibit, inter alia, the following drawbacks:

1. The control of the direct current switch must be different when operating in its net braking mode than when operating in its resistance braking mode so that with combined net and resistance braking high demands are placed on the current control circuits and the switch. For example, during the transition from full resistance braking to full net braking, the controller used must be actuated over almost its full range.

2. In the above-mentioned instance, the intermittently connected brake resistance cannot be used for excess voltage protection.

SUMMARY OF THE INVENTION

It is an object of the present invention to provide a circuit arrangement for combined net and resistance braking which is of uncomplicated construction.

It is another object of the present invention to provide a circuit arrangement for combined net and resistance braking which also functions as a protection circuit against excess voltage levels.

The foregoing objects, as well as others which will become clear from the text below, are accomplished in accordance with the present invention by providing a circuit arrangement for the combined net and resistance braking of an electrically driven vehicle which is fed via a pair of lines from a direct current power system. A capacitor is connected across the pair of lines, which may consist of a trolley wire and a ground connection. A resistive braking circuit is connected across the pair of lines. The resistive braking circuit includes a braking resistor and a controllable switch connected in series with one another. A voltage regulating circuit having its input connected across the capacitor is provided. The output of the voltage regulator is coupled to the control input of the controllable switch for supplying a control signal thereto which is produced whenever the voltage across the capacitor exceeds slightly the rated voltage of the pair of lines.

DETAILED DESCRIPTION OF PREFERRED EMBODIMENTS

Figure 1:
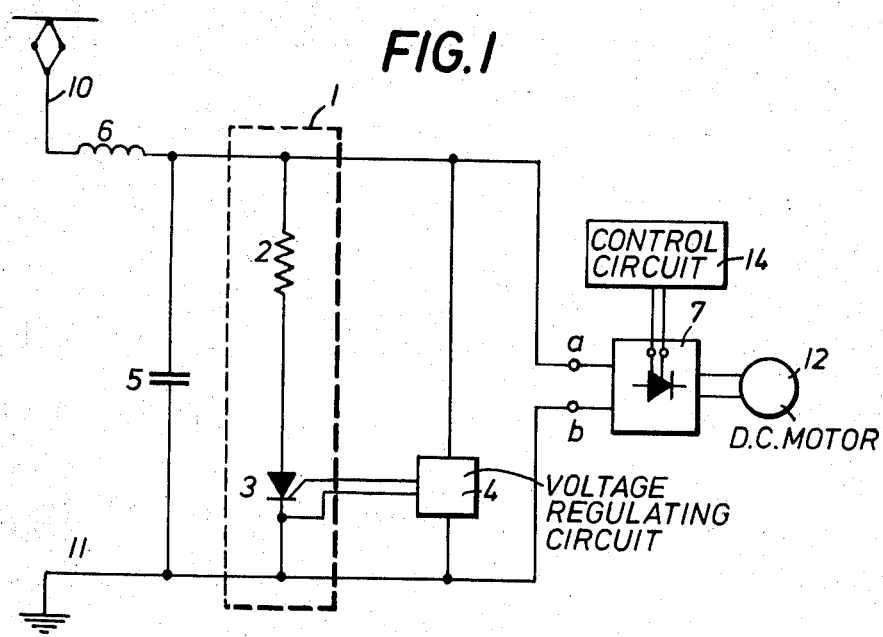
FIG. 1 is a schematic diagram of a circuit arrangement, according to the present invention, for the combined net and resistance braking of a vehicle driven by a direct current motor.

Referring to FIG. 1, a circuit arrangement for the combined net and resistance braking of an electrically driven vehicle (not illustrated) includes a buffer capacitor 5 connected across a pair of lines 10 and 11, one terminal of the capacitor 5 being connected directly to the line 11, shown as ground, and the other terminal being connected to the line 10, illustrated as a trolley wire, via a choke 6.

A resistive circuit, generally designated by the numeral 1, is connected directly in parallel with the capacitor 5. The resistive circuit 1 includes a braking resistor 2 and a controllable semiconductor switch 3 which are connected in series with each other. The control electrode of the controllable semiconductor switch 3 is connected to the output of a voltage regulating circuit 4.

The input of the voltage regulating circuit 4 is connected directly across the capacitor 5. During operation, the voltage regulator circuit 4 senses the voltage across the capacitor 5 and produces a control signal, as its output signal to the control electrode of the controllable semiconductor switch 3, whenever the voltage across the capacitor 5 exceeds slightly the rated voltage of the pair of lines 10, 11.

The voltage regulator circuit 4 may take a number of different forms. For example, the voltage regulator circuit 4 may be a conventional regulating control circuit which produces a direct current signal whenever the voltage across the capacitor 5 exceeds the rated line voltage by a predetermined value. The direct current signal is amplified, by a conventional amplifying circuit forming part of the voltage regulator circuit 4, and is applied to the control electrode of the controllable semiconductor switch to place it in its conductive state, resulting in the dissipation of energy in the braking resistor 2 so long as the controllable semiconductor switch 3 remains in its conductive state. Whenever the voltage across the capacitor 5 falls below the value slightly above the rated voltage of the pair of lines 10, 11, the voltage regulator circuit 4 responds by abruptly terminating or changing the level of its direct current signal, the amplifying circuit within the voltage regulator amplifies the signal which results in the production of a turn-off pulse which places the controllable semiconductor switch 3 in its non-conductive state terminating the resistance braking. As an alternative construction, the voltage regulator circuit 4 may be a pulse producing circuit which produces a train of pulses of a given repetition rate and varying pulse width in response to its input sensing that the voltage across the capacitor 5 exceeds slightly the rated voltage of the pair of lines 10, 11, the pulse width being substantially directly proportional to the extent the voltage across the capacitor 5 exceeds the rated line voltage. The pulses of varying width are amplified, as before, and the amplified pulses used to turn the controllable semiconductor switch on and off. Thus, the duty cycle of the controllable semiconductor switch 3 is varied as a function of the extent the voltage across the capacitor 5 exceeds a given voltage slightly above the rated voltage of the pair of lines 10, 11.

The working of both regulating systems is explained on principle by Heumann/Stumpe in the book "Thyristoren, Teubner-Verlag," Stuttgart 1969, pages 167 to 170. Furthermore there is described one regulating system above mentioned by Swoboda in "Elektro-Technik 47" (1965) pages 231 to 233, FIG. 3, and the other regulating system by Hengsberger, Putz, Vetters in "AEG-Mitteilungen," 1964, pages 438 to 442, especially FIGS. 7 and 8.

A direct current motor 12 is connected in series with the pair of lines 10, 11 via a d.c.-chopper circuit 7 and the choke 6, terminals *a* and *b* of the d.c.-chopper being effectively connected across the capacitor 5. As shown more in detail in FIG. 3 the d.c.-chopper 7 is connected to the direct current motor 12. The control circuit 14 provides an enabling signal to the d.c.-chopper 7 for placing it in its conductive state whenever an operator elects to run the motor 12 by energizing the control circuit 14. The control circuit 14 supplies pulses to turn the d.c.-chopper 7 on and off, respectively.

Figure 3:
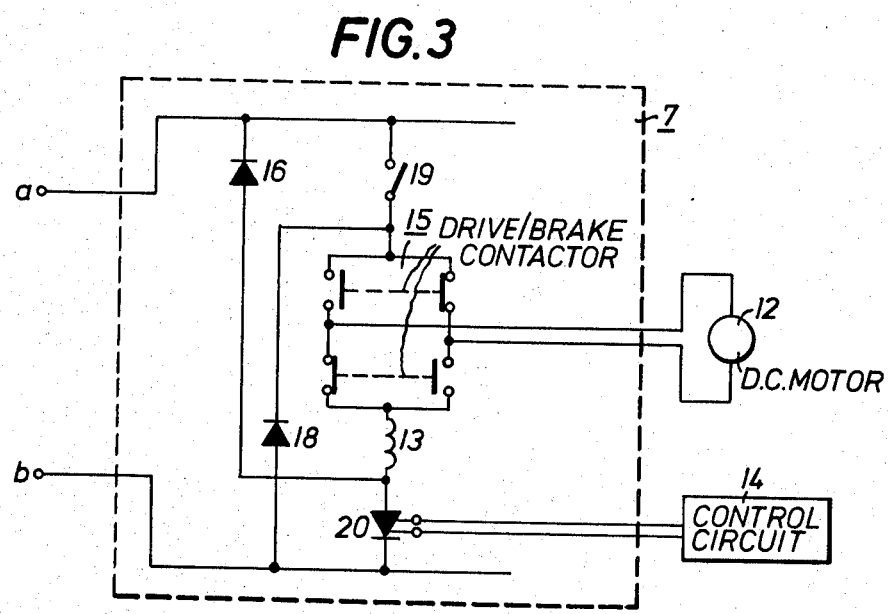
FIG. 3 is a more detailed diagram of a circuit arrangement shown in FIG. 1.

Referring to FIG. 3, which shows more detailed the interior circuit 7 of FIG. 1, a pair of terminals *a, b*, which correspond to the terminals *a, b* shown in FIG. 1 are connected to a semiconductor-device 7 as shown in FIG. 1 containing the thyristor 20 with its selfcommutating circuit (symboliced by the two gate electrodes), the free-wheel diode 16, the field of the motor 13, the switch 19 which is closed during driving operation only, and the drive/brake contactor 15 to change polarity of the motor when changing from driving to braking. The diode 18 is necessary for braking operation only, it is out function during driving condition i.e. when the contactor 19 is closed.

During operation, the brake resistor 2 is switched in and out of the circuit providing resistance braking. In the instance the voltage regulator circuit 4 is of the type which produces a train of pulses of a given repetition rate and the d.c.-chopper 7 is placed in its conductive state at a set repetition rate, it is advantageous to provide that the given repetition rate be a fixed whole number multiple of the set repetition rate. The repetition rate of the current through the braking resistor 2, for best operation, should lie above the highest possible resonant frequency of a circuit formed by the buffer capacitor 5, the choke 6 and the inductance of the net, including line 10. It is to be appreciated that the effective net inductance depends on the distance the vehicle is from the power stations feeding the net.

A complete embodiment of a motor control circuit for use in the d.c. motor embodiment of FIG. 1 is shown in FIG. 3 of the above mentioned magazine "Elektro-Technik 47," 1965, pages 231 to 233 and in the FIGS. 7 and 8 of the magazine "AEG-Mitteilungen," 1964, pages 438 to 442.

The resistance value of the braking resistor 2 is so dimensioned that, upon the occurrence of the full brake power and no acceptance capability of the net, the voltage which occurs across the capacitor 5 lies only slightly above the normal net voltage. If the vehicle is braked with less energy or if the net is capable of absorbing energy, the controllable semiconductor switch 3 is not placed in its conductive state by the voltage regulator circuit 4 which is connected in parallel with the resistive circuit 1 and the buffer capacitor 5. Semiconductor switch 3 consequently only conducts during periods required to convert electrical energy into heat so as to maintain the set voltage value. In the borderline case, the braking resistor 2 is effectively disconnected from the buffer capacitor 5 when the net absorption capability is high, i.e. when the controllable semiconductor switch 3 blocks. Since the resistive braking circuit 1 is switched on by the voltage regulating circuit 4 to different degrees during driving as well as braking, the circuit arrangement serves as an excess voltage protection during events which endanger the electrical system of the vehicle. Such events may occur, for example, from the resonating of the LC filter formed by the input chock 6, the inductance of the net including the wire 10 and the buffer capacitor 5 or by braking of a vehicle in the vicinity.

As can be seen from the foregoing, the braking resistor 2 with the aid of the controllable semiconductor switch 3 can be effected in two ways:

1. The voltage regulating circuit 4 may operate as a two-point regulator in that it senses the instant value of the voltage across the buffer capacitor 5 and regulates the value of the voltage appearing across the buffer capacitor 5 by the two point method, or 2. The voltage regulating circuit 4 may control the controllable semiconductor switch 3 in such a manner that this switch switches the braking resistor 2 into and out of connection across the buffer capacitor 5 at a constant repetition rate but with variable connection periods.

The first arrangement is less expensive and is particularly well suited for monitorable net conditions while the second arrangement is advantageous where a change in the net inductance (variable distance from the substation) can change the resonant frequency of the filter formed by the input choke 6, the net inductance and the buffer capacitor 5. In this case the repetition rate of the current through the braking resistor 2 must lie at an appropriate distance above the highest possible resonant frequency as pointed out above.

Figure 2:
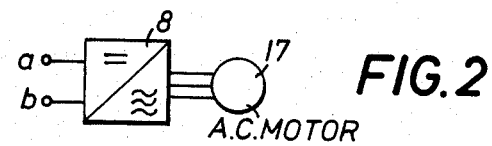
FIG. 2 is a schematic diagram of a modified portion of the circuit arrangement shown in FIG. 1 which adapts the circuit arrangement for the combined net and resistance braking of a vehicle driven by an alternating current motor.

Referring now to FIG. 2, a pair of terminals $a$ and $b$, which correspond to the terminals $a,b$, shown in FIG. 1, are shown connected to a combined D.C. to A.C./A.C. to D.C. converter 8. The converter 8, in turn, is connected to a three-phase alternating current motor 17. In order to operate the alternating current motor 17 and to provide combined resistance and net braking, the pair of terminals $a$ and $b$ are connected across the voltage regulating circuit shown in FIG. 1.

In operation, the converter 8 converts direct current to three-phase alternating current which is supplied to the alternating current motor 17 during running. During braking, the converter 8 converts three-phase alternating current from the alternating current motor 17 into direct current, the direct current being fed to the circuit arrangement shown to the left of the pair of terminals $a,b$, shown in FIG. 1.

A controllable converter circuit suitable for use as the circuit 8 in FIG. 2 is shown in the U.S. Pat. No. 3,399,336.

It will be understood that the above description of the present invention is susceptible to various modifications, changes and adaptations, and the same are intended to be comprehended within the meaning and range of equivalents of the appended claims.

I claim:

1. A circuit arrangement for the combined net and resistance braking of an electrically driven vehicle fed via a pair of lines from a direct current power system comprising, in combination:

a motor means for driving the vehicle,
   a controllable switching circuit means for coupling said motor means across said pair of lines,
   a capacitive means coupled across said pair of lines;
   a resistive braking circuit connected in parallel with said capacitive means, said resistive braking circuit including a resistance means and a controllable switch means connected in series with one another, said controllable switch means having a control input;
   voltage regulating circuit means having an input means and an output means, said input means being connected in parallel with said capacitive means and responsive to the voltage appearing across said capacitive means for developing a control signal across its output means upon the occurrence of a voltage across said capacitive means which exceeds slightly the rated voltage of said pair of lines; and
   means for coupling said output means of said voltage regulating circuit means to said control input of said controllable switching means for maintaining the voltage across said capacitive means substantially constant.

2. A circuit as defined in claim 1 wherein said controllable switch means is a semiconductor switch.

3. A circuit as defined in claim 1 wherein said voltage regulating circuit means is a pulse producing circuit responsive to the voltage across said capacitive means and which produces as the control signal pulses of varying width, the width of the pulses depending on the voltage appearing across said capacitive means in excess of a voltage level slightly above the rated voltage of said pair of lines.

4. A circuit as defined in claim 1 wherein said voltage regulating circuit means is a regulator circuit which produces as the control signal a direct voltage signal whenever the voltage across said capacitive means exceeds a voltage level slightly above the rated voltage of said pair of lines.

5. A circuit as defined in claim 3 wherein said pulse producing circuit produces pulses having a given repetition rate.

6. A circuit as defined in claim 1 wherein said motor means is a direct current motor and wherein said controllable switching circuit means is a thyristor including its selfcommutating circuit means for coupling energy from the direct current motor means to said capacitive means and said pair of lines during braking and for coupling energy from said pair of lines to said direct current motor means during running.

7. A circuit as defined in claim 6 further comprising circuit means coupled to said controllable switching circuit means for intermittently activating said controllable switching circuit means at a set repetition rate whereby said direct current motor means is coupled across said pair of lines and said capacitive means at the set repetition rate.

8. A circuit as defined in claim 5 wherein said motor means is a direct current motor, and said controllable switching circuit means is a thyristor including its self-commutating circuit means; and further comprising circuit means coupled to said controllable switching circuit means for intermittently activating said controllable switching circuit means at a set repetition rate, said given repetition rate being a fixed and whole number multiple of said set rate.

9. A circuit as defined in claim 1 wherein said motor means is an alternating motor means and wherein said controllable switching circuit means includes converter means for converting direct current from said pair of lines into alternating current as input to said alternating current motor means during running and for converting alternating current from said alternating current motor means into direct current as input to said pair of lines and said capacitive means during braking.

10. A circuit as defined in claim 9 further comprising circuit means coupled to said converter means for intermittently activating said converter means at a set repetition rate during braking.

11. A circuit as defined in claim 10 wherein said voltage regulating circuit means is a pulse producing circuit responsive to the voltage across said capacitive means and which produces as the control signal pulses of given repetition rate, said given repetition rate being a fixed whole number multiple of said set repetition rate.

12. A circuit as defined in claim 11 wherein said pulse producing circuit produces as the control signal pulses of varying width, the width of the pulses depending on the voltage appearing across said capacitive means in excess of a voltage level slightly above the rated voltage of said pair of lines.

13. A circuit as defined in claim 1 wherein said resistive braking circuit and said voltage regulator means are effective as operatively arranged to provide excess voltage protection for said motor means.

* * * * *